Feb. 20, 1934.　　　G. F. DRIEMEYER　　　1,948,259
RAILWAY VEHICLE STRUCTURE
Filed July 3, 1931　　　5 Sheets-Sheet 1
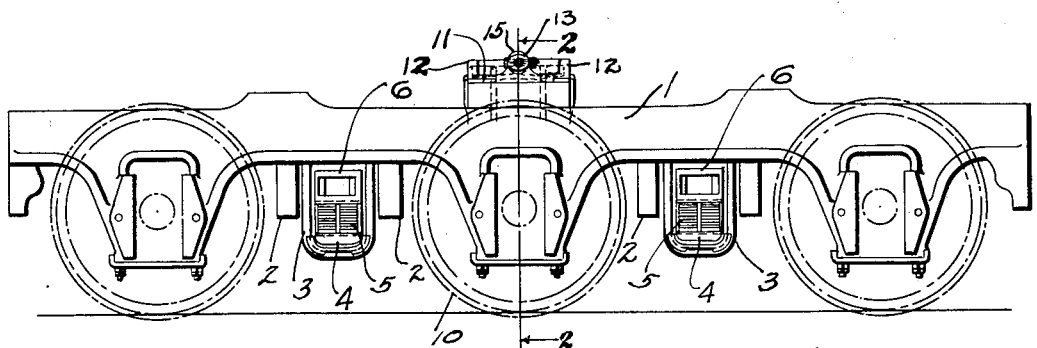
Fig. 1.
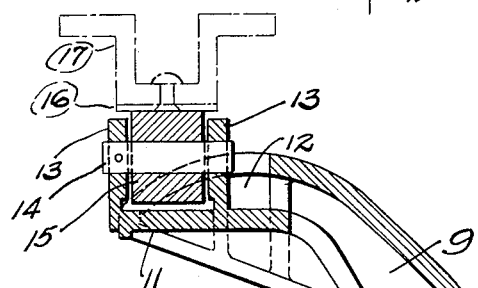
Fig. 2.
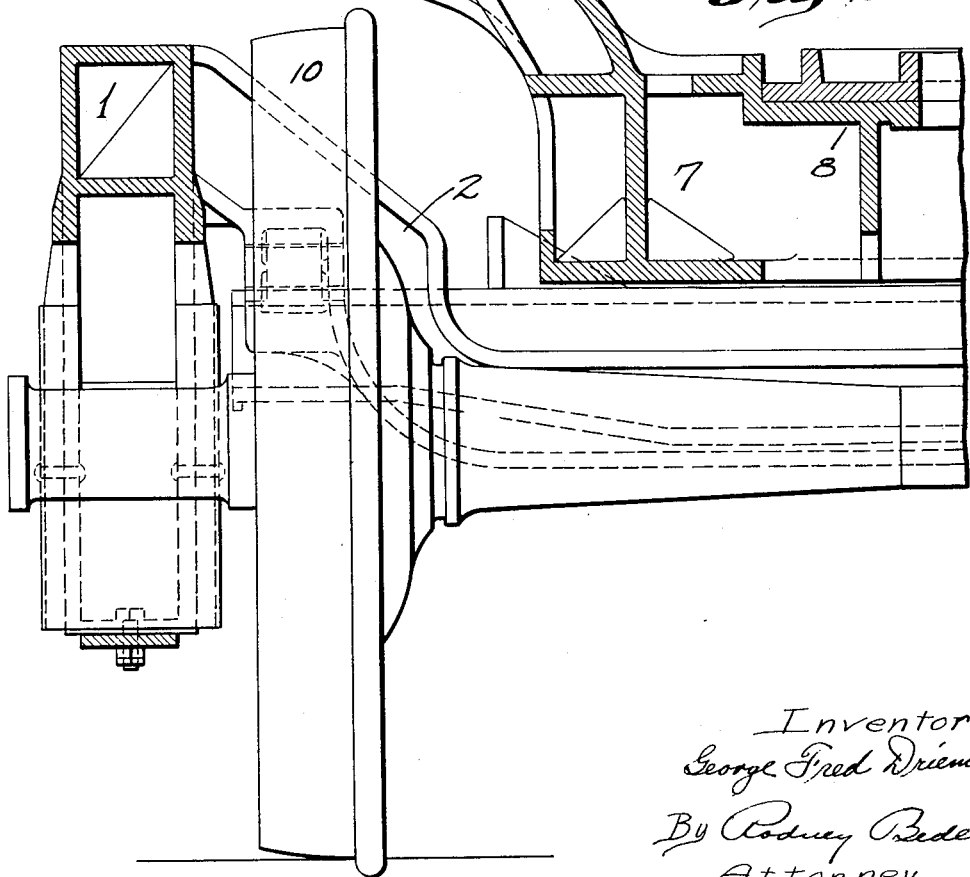
Inventor
George Fred Driemeyer
By Rodney Bedell
Attorney

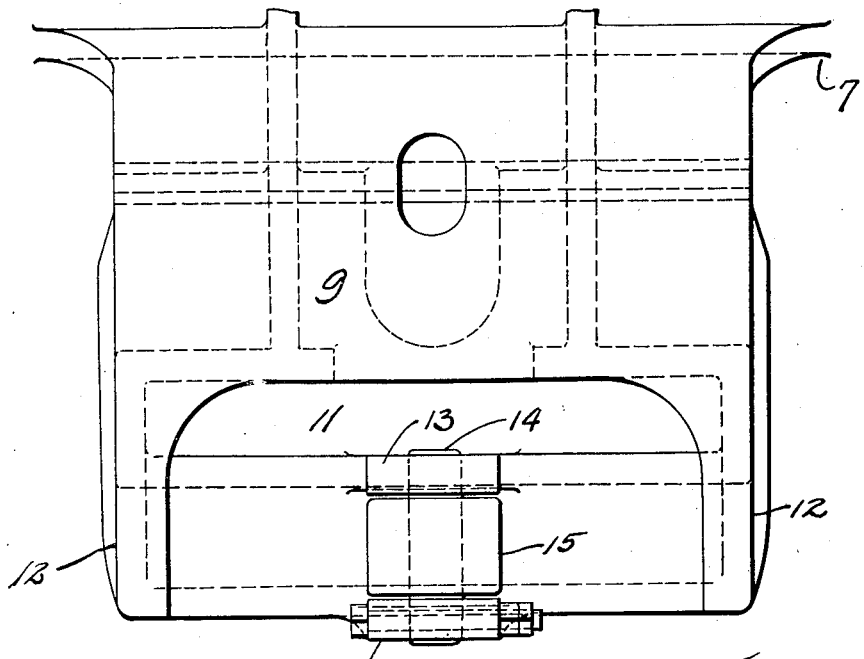
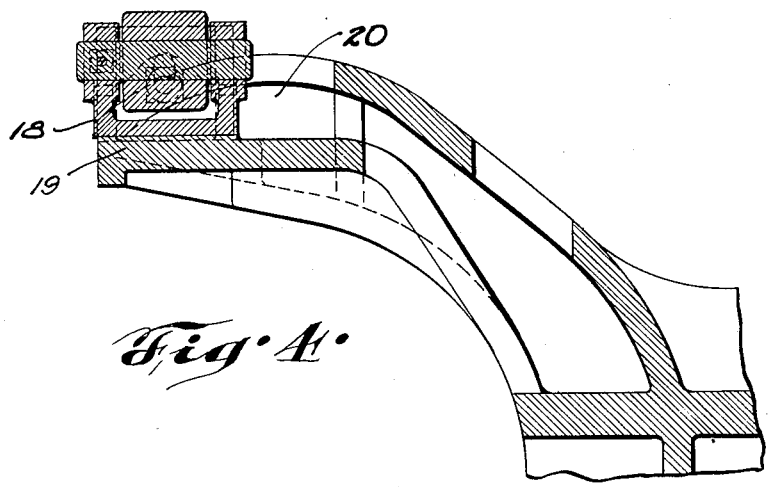

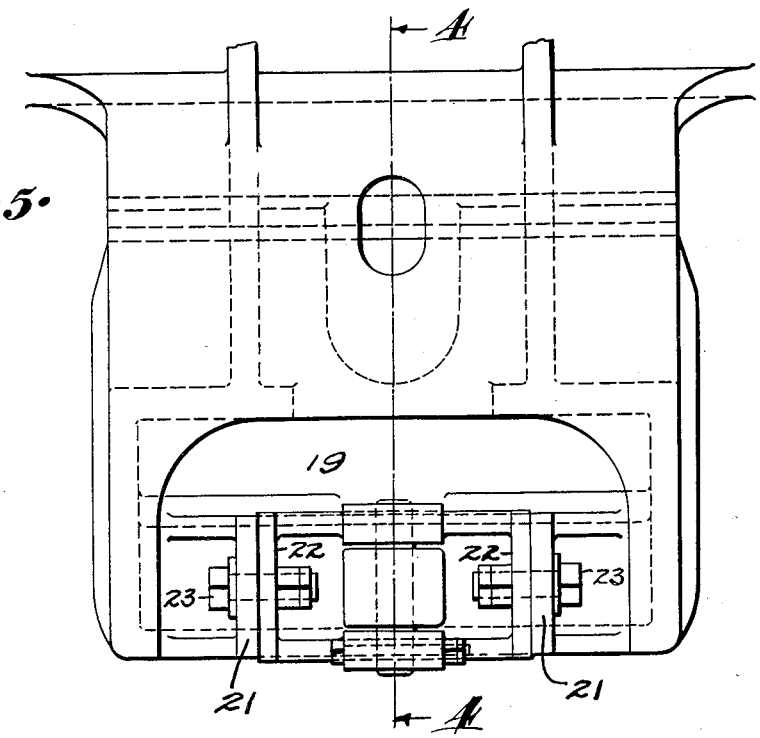
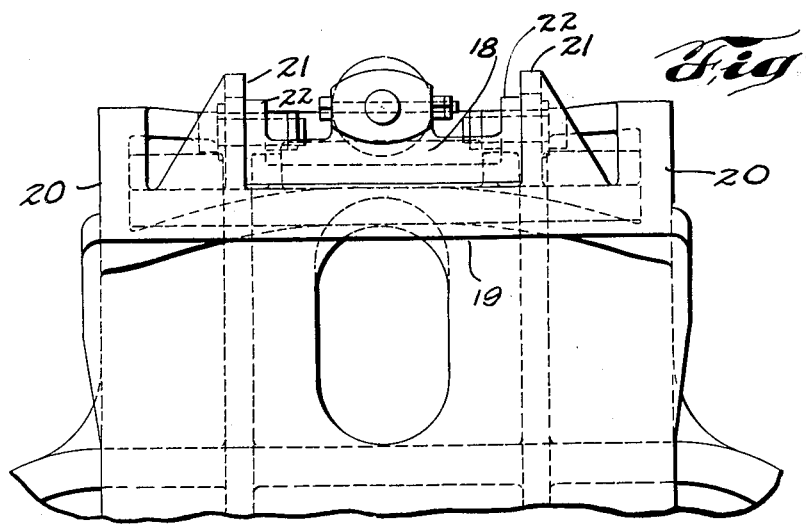

Feb. 20, 1934.     G. F. DRIEMEYER     1,948,259
RAILWAY VEHICLE STRUCTURE
Filed July 3, 1931     5 Sheets-Sheet 4
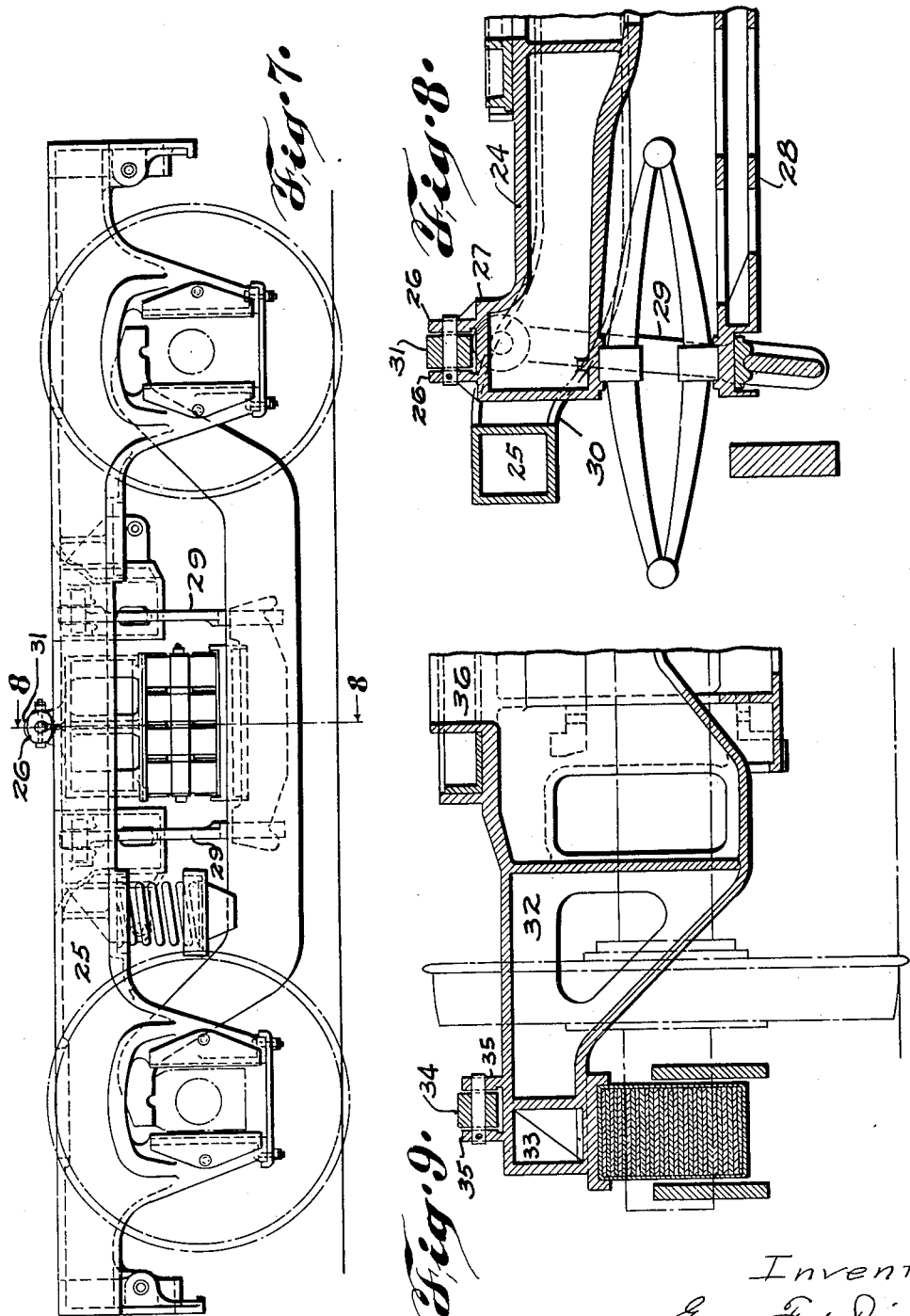

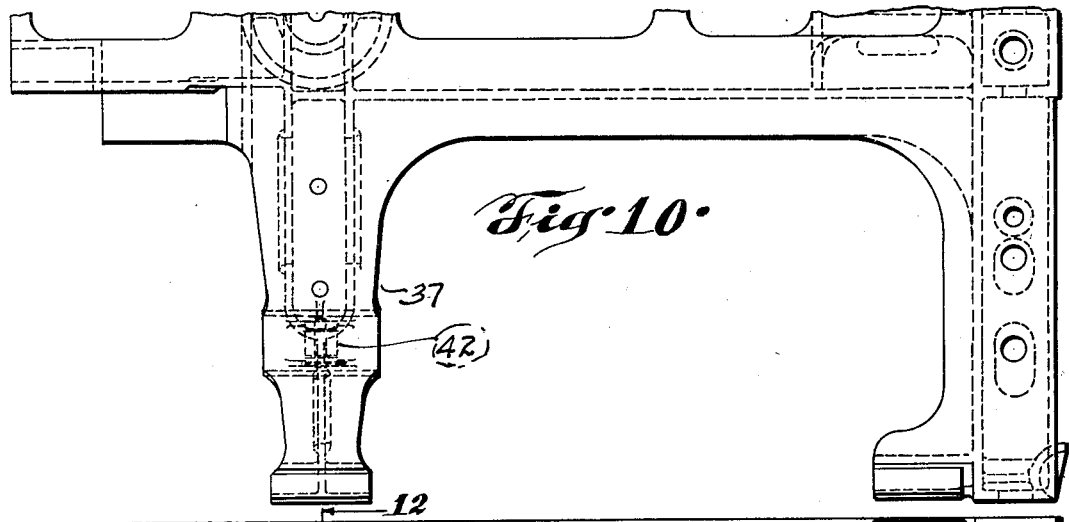
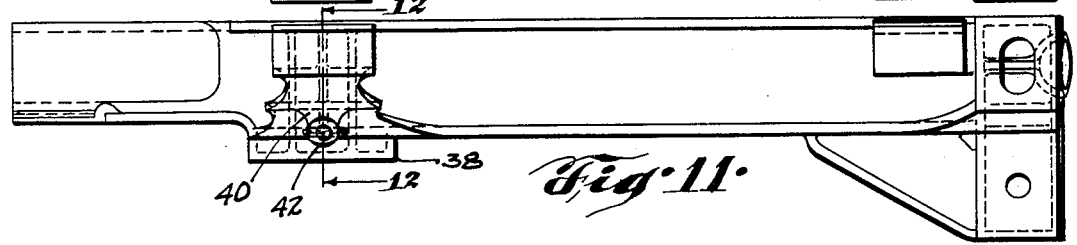
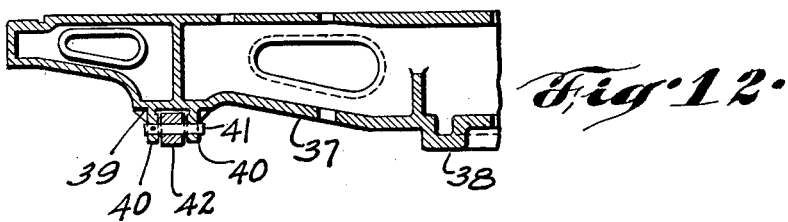
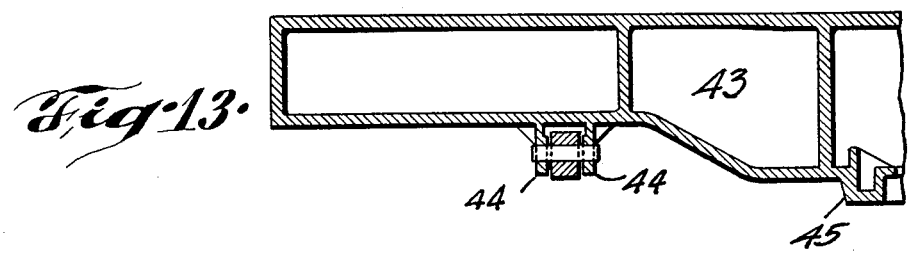
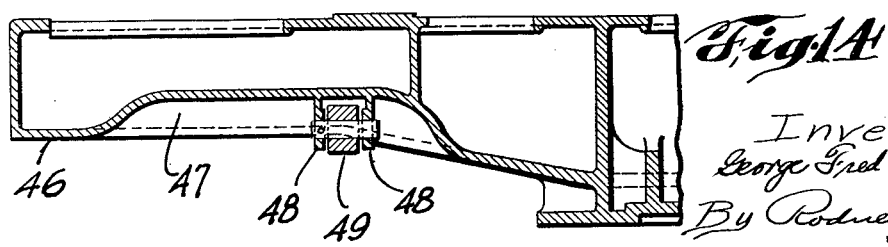

Patented Feb. 20, 1934

1,948,259

UNITED STATES PATENT OFFICE 1,948,259

RAILWAY VEHICLE STRUCTURE

George Fred Driemeyer, Paris, France, assignor to General Steel Castings Corporation, Granite City, Ill., a corporation of Delaware Application July 3, 1931. Serial No. 548,522

2 Claims. (Cl. 105—196)

The invention relates to railway rolling stock and consists in a novel arrangement of anti-friction side bearings and associated structure whereby the parts involved are simplified, rendered more rigid and better adapted to provide maximum clearance and to facilitate inspection and renewal of anti-friction elements.

The invention is particularly adapted for use in connection with six wheel trucks in which the side bearings are usually over the center wheels of the truck, making it difficult to apply a roller or ball side bearing either to the truck bolster or to the body bolster without encroaching upon the clearances necessary between the wheel and the side bearing arm of the bolster and between the brake levers and the bolster or side bearing arm of the bolster.

The structure of this application is adapted to overcome the difficulties indicated above and the elimination of these and similar difficulties constitutes the main object of the invention.

The invention is particularly adapted to anti-friction side bearings consisting of either a roller or ball or rocker mounted in a housing having a vertical member or flange and the invention contemplates the integral formation of the vertical member or flange with a portion of the truck or body underframe.

In the accompanying drawings illustrating various forms of the invention—

Figure 1 is a side view of a six wheel truck of the swinging bolster type illustrating the end of the center bolster with a side bearing roller mounted thereon.

Figure 2 is a vertical transverse section taken on the line 2—2 of Figure 1 and also showing a cooperating body element.

Figure 3 is a top view of the truck bolster side bearing arm showing the roller and its mounting.

Figure 4 is a detail section illustrating a modification of the structure shown in Figure 2 and Figure 5 is a top view and Figure 6 is a side view of the same structure.

Figure 7 is a side view of a four wheel truck in which the swinging bolster and side bearing roller and its mounting are located intermediate the truck wheels.

Figure 8 is a vertical transverse section on the line 8—8 of Figure 7.

Figure 9 is a similar section illustrating a truck in which the bolster is rigid with the frame wheel pieces.

Figure 10 is a top view of a car underframe platform casting having integral vertical elements for mounting the side bearing roller.

Figure 11 is a side view of the same.

Figure 12 is a vertical transverse section taken on the line 12—12 of Figure 11.

Figure 13 is a similar section through a one-piece vehicle underframe.

Figure 14 is a similar section through a tender underframe forming the bottom of the tender water tank.

The truck shown in Figures 1, 2, and 3 has a frame including the wheel pieces 1 and transoms 2 from which swinging links 3 carry spring planks 4 mounting truck springs 5 which support cross bolsters 6 in the usual manner, the cross bolster being connected by a center bolster 7. All of this construction is of familiar form. The center bolster 7 includes a center portion 8, for receiving the center plate, and transversely extending arms 9 which project outwardly over the center wheel 10. The end portion of each arm 9 includes a horizontal web plate 11 and vertical ribs 12 which extend above and below web 11 and provide substantial depth and rigidity for the outer portion of the arm.

Integral with web 11 are upstanding flanges 13 extending longitudinally of the truck and spaced from each other and providing seats for a pin 14 which carries a roller 15 forming the anti-friction element of the truck side bearing and engaging a hardened steel plate 16 secured to the adjacent portion of the vehicle body.

Heretofore it has been the practice to provide finished pads on the end of center bolster side bearing arms for mounting a separately formed side bearing body or housing for the anti-friction element, which practice obviously requires the lowering of the center bolster side bearing arm towards the wheel or the elevation of the adjacent body member above the wheel a greater distance than that required for plain friction side bearings comprising opposed horizontal plates. Either lowering the center bolster side bearing arm or elevating the adjacent body member is objectionable due to limited clearance conditions and the structure described above provides for housing the anti-friction element in a recess extending inwardly from the normal outer face of the bolster and permits the inclusion of anti-friction elements, with suitable mounting, between the body and truck bolsters with sufficient clearance between the center bolster side bearing arm and the truck wheel. The housing or pocket formed by ribs 12 and web 11 is open at the outer side of the bolster to facilitate inspection and provide easy access to the side bearing parts.

With this arrangement it is also possible to provide for a separately formed side bearing housing, if desired, as the flanges 13 can be machined off and the separately formed member applied to the horizontal web plate 11.

Figures 4, 5, and 6 illustrate a similar structure in which a separate roller mounting body 18 is mounted on a horizontal web plate 19 formed on the center bolster arm but the latter includes the vertical ribs 20 for reinforcing purposes and also includes upstanding flanges 21 to which the end portions 22 of body 18 may be secured by suitable bolts 23 and this eliminates the projection of any securing bolts below web plate 19 which would reduce the clearance over the truck wheel or require the plate 19 to be located at a higher level.

In the four wheel truck shown in Figures 7 and 8, the bolster 24 is of the usual single transverse arm type extending between and at approximately the same level as the wheel pieces 25 of the truck frame and having roller side bearing mounting flanges 26 formed integral with its outer end portion 27. The bolster is mounted upon the spring plank 28 carried by swing hangers 29 from the truck transoms 30 and, in its general operation, corresponds to the bolster structures previously described but is of deeper section throughout its length since it does not need to project over the truck wheels. The side bearing anti-friction element 31 is just above the level of the top of the wheel piece 25.

In the modification illustrated in Figure 9, the bolster 32 is rigid with the wheel piece 33 and the side bearing anti-friction element 34 is journalled on flanges 35 which are integral with the wheel piece and bolster. The center bearing structure 36, also integral with the bolster, is located at a higher level than the side bearing as is a common arrangement with this type of truck.

The general arrangement of the novel features of the truck bolster structure described above may be incorporated also in the body bolster structure and Figures 10, 11, and 12 illustrate a car platform casting having a transverse bolster 37 with center plate structure 38 and side bearing structure 39 integral therewith. Depending flanges 40 provide seats for the pin 41 on which the roller 42 is mounted and it will be understood that the adjacent part of the truck (not shown) will include a plate which roller 42 may engage to limit the relative vertical movement of the truck and body bolsters.

Figure 13 illustrates a similar structure in which the entire car underframe consists of a single casting including a bolster portion 43 through which the section is taken, flanges 44 being integral with the underframe casting and center plate 45 preferably being integral therewith also.

In Figure 14 there is illustrated a tender underframe having a web 46 which forms the bottom wall of the tender water tank and is recessed upwardly, as indicated at 47, to elevate flanges 48 so that the side bearing roller 49 may be located at a higher level relative to the rest of the structure than the roller shown in Figures 12 and 13. The invention is of special value in this application because it eliminates the necessity of providing any holes through the bottom web of the tank for bolting or riveting the side bearing body member thereto.

While I have illustrated various modifications of my invention in the accompanying drawings, it will be understood that many other variations in design will be made in adapting the invention to different requirements and I contemplate the exclusive use of such modifications as come within the scope of my claims.

I claim:

1. A railway truck bolster having a pocket formed therein, and side bearing members located in said pocket and formed integral with said bolster, said side bearing members being adapted to support an anti-friction element, said pocket also being adapted for mounting separately formed side bearing members when said integral side bearing members are machined off.

2. A railway bolster having a pocket therein, and a projection in said pocket forming a bearing for an anti-friction device, said pocket being adapted to mount another bearing device when said projection is removed.

GEORGE FRED DRIEMEYER.